United States Patent [19]

Frees et al.

[11] Patent Number: 5,598,306
[45] Date of Patent: Jan. 28, 1997

[54] DAMPING POST FOR REDUCING ACOUSTIC NOISE IN A DISK DRIVE

[75] Inventors: Gregory M. Frees, Sunnyvale, Calif.; Masakazu Sasaki, Kanagawa, Japan

[73] Assignee: International Business Machines Corporation, Armonk, N.Y.

[21] Appl. No.: 282,932

[22] Filed: Jul. 29, 1994

[51] Int. Cl.$^6$ .................................................. G11B 33/14
[52] U.S. Cl. ...................................... 360/97.02; 360/98.01
[58] Field of Search .............................. 360/97.02, 98.01

[56] References Cited

U.S. PATENT DOCUMENTS

| | | | |
|---|---|---|---|
| 5,021,905 | 6/1991 | Sleger | 360/97.02 |
| 5,079,655 | 1/1992 | Yagi | 360/97.02 |
| 5,214,549 | 5/1993 | Baker et al. | 360/97.02 |
| 5,235,482 | 8/1993 | Schmitz | 360/97.02 |
| 5,272,580 | 12/1993 | Hickox et al. | 360/97.02 |
| 5,282,100 | 1/1994 | Tacklind et al. | 360/97.02 |

*Primary Examiner*—A. J. Heinz
*Attorney, Agent, or Firm*—Esther E. Klein

[57] ABSTRACT

Some disk drives produce a relatively large amount of acoustical noise. This noise is generated by vibrations of the disk drive cover caused by movement of the spindle motor and/or actuator head. A disk drive assembly is provided that significantly reduces the amount of acoustic noise emanating from a disk drive. An enclosure for a disk stack assembly, comprising at least one disk, mounted on a spindle attached to a motor and an actuator assembly, comprising at least one head attached to an actuator, is provided. The enclosure has an inner chamber with a post extending outwardly from a surface of the inner chamber. A compressible material is disposed at one end of the post abutting in a compressed state an opposing surface of the inner chamber. In a preferred embodiment, the post is integrally formed with the inner chamber and is unattached from the opposing surface. The damping post is preferably positioned in a position of maximum deflection for the vibration mode of the assembly. The damping post mass is such that the device enclosure frequencies are shifted away from source excitation forces improving the disk drive acoustic performance.

17 Claims, 5 Drawing Sheets

EXAMPLE OF A VIBRATION MODE SHAPE OF THE COVER OF A DISK DRIVE.

DAMPING MATERIAL – "COMPRESSION DAMPER"

DAMPING POST FOR REDUCING ACOUSTIC NOISE IN A DISK DRIVE

FIELD OF THE INVENTION

This invention relates to disk drives and more particularly to reducing acoustic noise produced by a disk drive operation.

BACKGROUND OF THE INVENTION

Direct access storage devices (DASDs), also referred to as disk drives or files, store information on concentric tracks of a rotatable magnetic recording disk. One or more disks are mounted on a spindle shaft connected to a spindle motor. A magnetic head or transducer element is moved from track to track on a disk to record and read the desired information. Typically a plurality of disks are stacked on one spindle shaft with a plurality of read/write heads positioned over the disk surfaces such that each surface of the disk has a corresponding head. Each head is attached to one of a plurality of suspensions which in turn are attached to a plurality of actuator arms which are connected to a rotary actuator or are an integral part of a rotary actuator comb. The actuator moves the heads in a radial direction across the disks. The heads, suspensions, arms and actuator comprise an actuator assembly. The disk, spindle and motor comprise a disk stack assembly. The disk stack assembly and actuator assembly are sealed in an enclosure, referred to as a disk or device enclosure. The device enclosure comprises a cover and a base plate. The disk stack assembly and actuator assembly are mounted on the base plate of the device enclosure.

An operating disk drive can emit relatively large amounts of acoustic noise generated by vibrations of the disk drive cover caused by the spinning motions of the spindle and seek and track following motions of the actuator. The spindle and actuator movements create forces that act on the structure of the disk drive. These forces eventually find a path to the device enclosure. When the forces reach the device enclosure, the forces are converted into displacements which in turn create pressure waves in the surrounding air which are perceived as acoustic noise to the human ear.

The device enclosure actually acts like a speaker for the internal forces created by the spindle and actuator movement. The dynamics of the device enclosure, such as the natural modes of vibration, act as mechanical amplifiers for the forces generated inside the drive. It has been found that the shape of the acoustic spectrum in the frequency domain is similar to the shape of the mechanical transfer function of the device enclosure. If it were possible to make the device enclosure infinitely stiff then no displacements could be created that would be manifested as acoustic noise.

Acoustic noise emanating from a disk drive is a critical performance factor that is usually tightly specified to be below a maximum level. As part of the quality assurances practices when manufacturing disk drives, the drives are tested in an acoustic tester to determine the amount of noise emanating from the device. Drives that emit noise above a maximum threshold need to be re-worked to be in compliance with the requirements. The re-working of disk drives consumes time and money which adds to the overall manufacturing costs for a disk drive unit.

Various schemes have been used in the prior art to modify the dynamics of the device enclosure to reduce the acoustic noise. For example, constrained layer dampers have been attached to disk drives. This method involves attaching a piece of sheet metal acting as a constraining layer to the cover and/or base of the device enclosure with a relatively thick layer of visco-elastic material between the sheet metal and cover and/or base. The visco-elastic material acts as a damper. However, constrained layer dampers are relatively expensive and add parts and complexity to the disk drive file assembly process.

U.S. Pat. No. 5,214,549 to Baker et al discloses a disk drive assembly having a cover with an additional plate and damping material between the plate and the cover in order to reduce acoustic noise. The damping layer damps acoustic vibrations imparted to the cover by the internally disposed components.

U.S. Pat. No. 5,282,100 to Tacklind et al discloses a disk drive having an outer cover for the drive which fits over an inner cover with raised plateaus in the inner cover and holes in the outer cover for accommodating the raised portion of the inner cover. Sound dampening material is placed between the inner and outer cover.

U.S. Pat. No. 5,235,482 to Schmitz discloses placing a gasket around the periphery where the cover and the base come into contact in order to reduce vibration and acoustic noise and provide greater damping of mechanical resonance in the disk drive. Additionally, a layer of damping material is inserted between the base assembly and circuit board assembly.

U.S. Pat. No. 5,079,655 to Yagi discloses a system for absorbing external or internal vibrations or shocks that may adversely affect a disk drive. The occurrence of a vibration while the drive is in operation may cause a head to be moved out of line with the required track resulting in an operation error. To protect the magnetic disk apparatus from such vibrations, a structure in the form of an external frame supporting the housing is used to absorb the vibration. Dampers are disposed vertically and horizontally between the exterior frame and the housing.

As greater emphasis is placed on simpler disk drive designs and ease of construction to reduce the cost of a disk drive assembly, there is a need for a scheme to sufficiently control the amount of acoustic noise emitted from a disk drive which does not add excessive cost or materials to the construction of the disk drive. As greater emphasis is also being placed on the size of the disk drive assembly system there is a need to reduce the noise without using much of the limited space in the disk assembly or increasing the overall size of the disk drive assembly.

The prior art systems have draw backs in increasing the complexity of the manufacturing processes, increasing the size, and increasing the number of parts used in the disk drive system.

SUMMARY OF THE INVENTION

The present invention greatly reduces the noise produced by vibrations on the disk drive enclosure caused by movement of elements within the disk drive assembly, particularly, the spindle motor and/or actuator head. A disk drive assembly is provided that significantly reduces the amount of acoustic noise emanating from a disk drive without increasing the overall size of the disk drive assembly and with minimal additional costs to the manufacturing process.

An enclosure for a disk stack assembly, comprising at least one disk, mounted on a spindle attached to a motor and an actuator assembly, comprising at least one head, attached to an actuator, is provided. The enclosure has an inner chamber with a post extending outwardly from a first surface of the inner chamber. A compressible material is disposed at one end of the post abutting an opposing second surface of the inner chamber.

In a preferred embodiment, the post is integrally formed with the first surface of the inner chamber and is unattached from the opposing second surface. The compressible damping material is preferably a visco-elastic material or foam material.

The damping post is preferably positioned closest to a point of maximum deflection for the vibration mode of the assembly and the damping post mass is such that the device enclosure frequencies are shifted away from source excitation forces.

For a fuller understanding of the nature and advantages of the present invention reference should be made to the following detailed description taken in conjunction with the accompanying drawings.

DESCRIPTION OF THE PREFERRED EMBODIMENT

Figure 1:
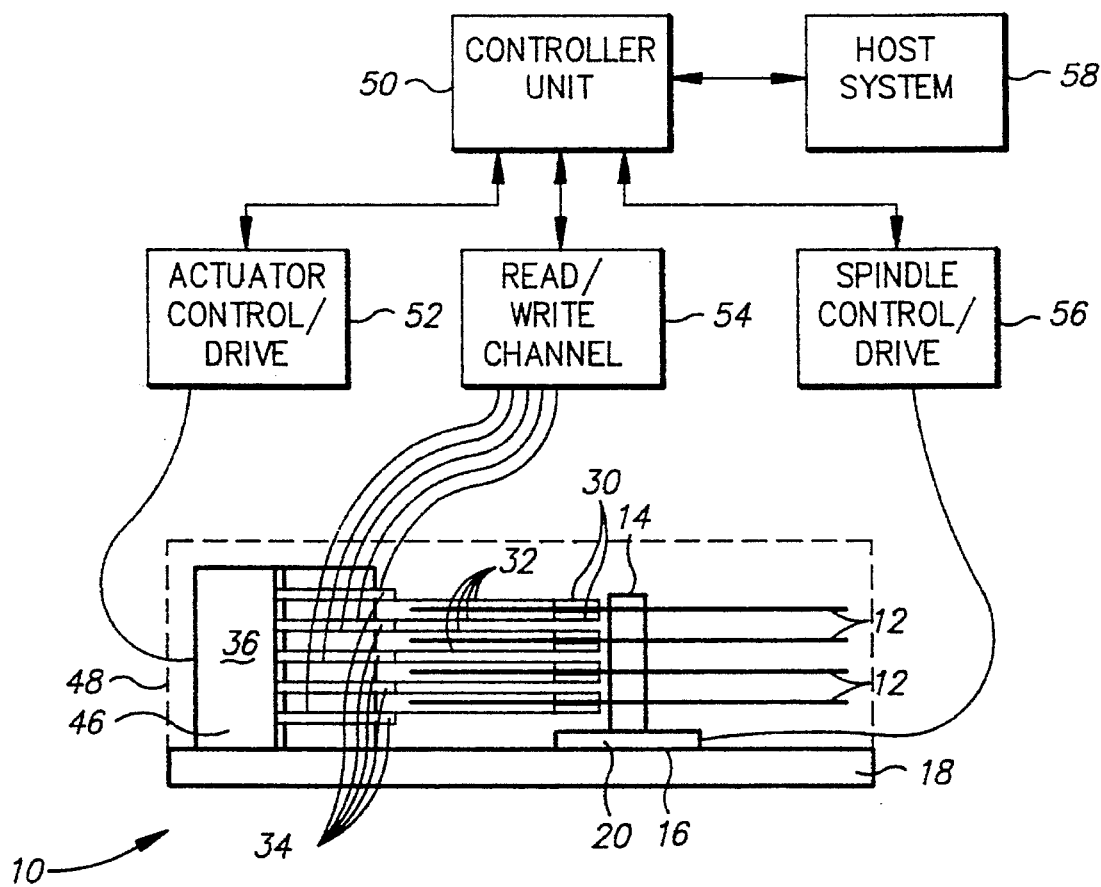
FIG. 1 is a schematic diagram of a data storage system of the present invention.

FIG. 1 shows a schematic diagram of a data storage system of the present invention and is designated by the general reference number 10. System 10 comprises a plurality of magnetic recording disks 12, each disk has a plurality of concentric data tracks. Disks 12 are mounted on a spindle shaft 14 which is connected to a spindle motor 16. Motor 16 is mounted to a chassis (the base plate) 18. The disks 12, spindle 14 and motor 16 comprise a disk stack assembly 20.

A plurality of read/write heads 30 are positioned over the disks 12 such that each surface of the disks 12 have a corresponding head 30. Each head 30 is attached to one of a plurality of suspensions 32 which in turn are attached to a plurality of actuator arms 34 connected to a rotary actuator 36. Alternatively, arms 34 may be an integral part of the rotary actuator comb. Actuator 36 moves the heads in a radial direction across disks 12. Actuator 36 typically comprises a rotating member 38 mounted to a rotary (or linear) actuator. Actuator 36 is also mounted to chassis 18. The heads 30, suspension 32, arms 34 and actuator 36 comprise an actuator assembly 46. The disk stack assembly 20 and actuator assembly 46 are sealed in a device enclosure 48 shown in dash lines which provides protection from particulate contamination.

A controller 50 provides overall control to system 10. Controller unit 50 typically contains a central processing unit, memory unit and other digital circuitry. Controller 50 is connected to an actuator controller drive unit 52 which is in turn connected to actuator 36. This allows controller 50 to control the movement of heads 30 over disks 12. The controller 50 is connected to a read/write channel 54 which in turn is connected to the heads 30. This allows controller 50 to send and receive data from the disks 12. Controller 50 is connected to a spindle control drive unit 56 which in turn is connected to spindle motor 16. This allows controller 50 to control the rotation of disks 12. A host system 58 which is typically a computer system is connected to the controller unit 50. System 58 may send digital data to controller 50 to be stored on disks 12 or may request that digital data be read from the disks 12 and sent to the system 58. The basic operation of DASD units is well known in the art.

Figure 2:
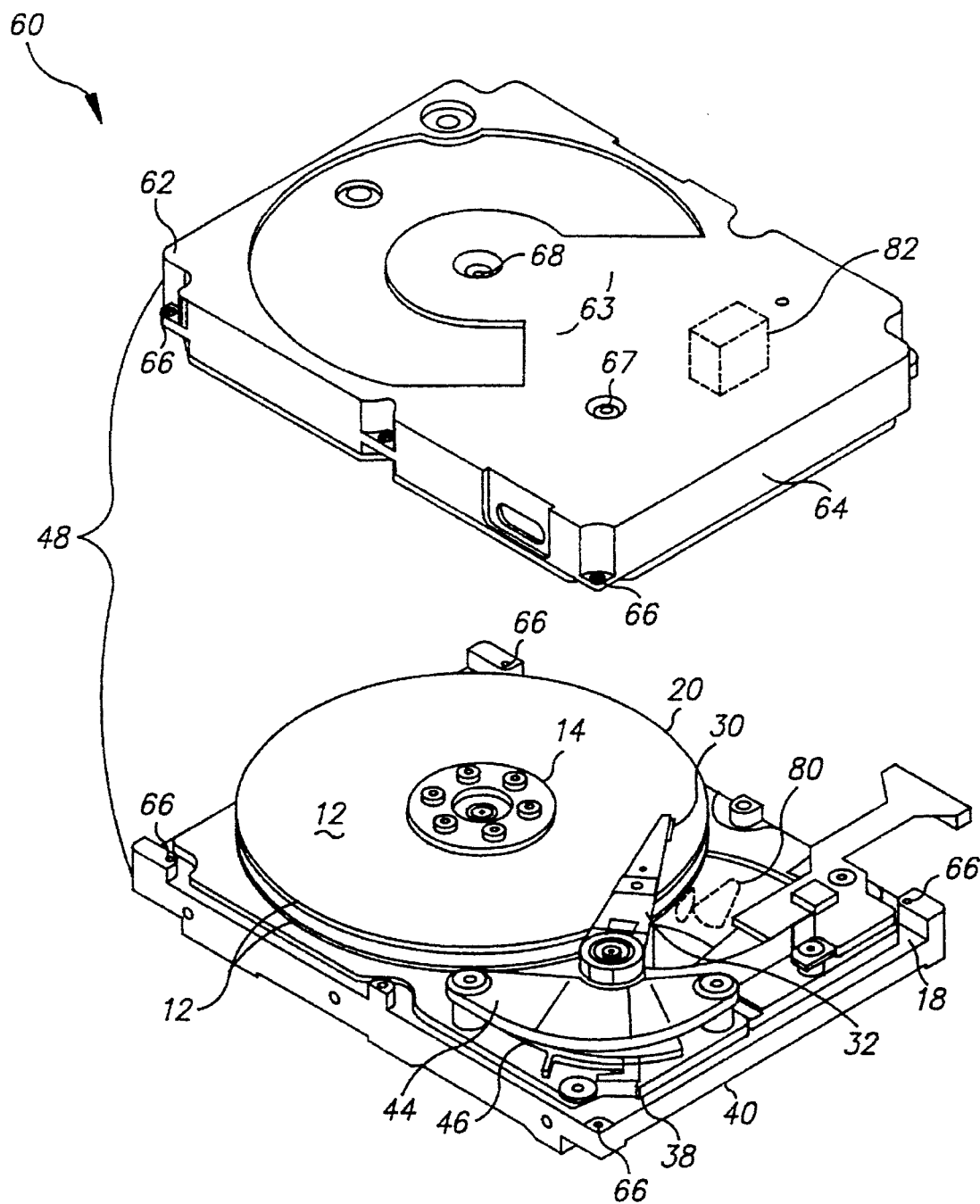
FIG. 2 is a perspective view of a cover and a base with disk stack assembly and actuator assembly mounted thereon.

FIG. 2 shows a perspective view of the disk drive assembly (file) 60 including the device enclosure cover 62. The device enclosure 48 comprises a base plate 18 on which the disk stack assembly 20 and actuator assembly 46 are mounted. The cover 62 of the device enclosure 48 comprises a top plate 63 and peripheral side walls 64 extending from the top plate 65. The disk stack assembly 20 and actuator assembly 46 are mounted within the interior chamber of the device enclosure 48. There are other disk drive enclosure configurations that are used in the industry for which the present invention can be incorporated. In particular, the peripheral side walls could be attached to the base plate rather than the cover plate. There are also disk drives having two side compartments which attach together. The disk stack assembly and actuator assembly slide horizontally into a first side and the other side attaches to the end of the first side to form an enclosure.

As shown in FIG. 2 the cover 62 is secured to the base plate by screws through screw holes 66 thus surrounding the disk stack assembly 20 and actuator assembly 46. The actuator and spindle attach to the cover by screws through screw holes 67 and 68, respectively. Alternatively, the actuators and disk assemblies can be attached only to base as is common in many disk drive assemblies.

When in operation, the disk drive as described thus far, can emit relatively large amounts of acoustic noise generated by vibrations of the disk drive cover 62. The vibrations are caused by the spinning motions of the spindle 14 and seek and track following motions of the actuator 46. The spindle and actuator movements create forces that act on the structure of the disk drive. These forces eventually find a path to the device enclosure 48. When the forces reach the device enclosure, the forces are converted into displacements which in turn create pressure waves in the surrounding air which are perceived as acoustic noise to the human ear.

Figure 3:
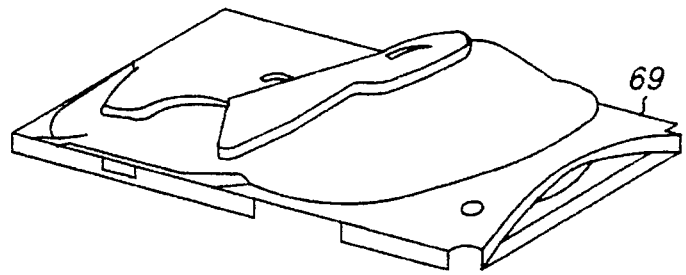
FIG. 3 is a diagram of an example of vibration mode shape of a disk drive cover.

The dynamics of the device enclosure, such as the natural modes of vibration, act as mechanical amplifiers for the forces generated inside the drive. It has been found that the shape of the acoustic spectrum in the frequency domain is similar to the shape of the mechanical transfer function of the device enclosure. FIG. 3 shows one of the typical mode shapes of a disk drive cover 69. If a vibration source inside the enclosure creates a disturbance that matches the frequency of this mode then the mode is excited and creates relatively large displacements and large acoustic emissions (noise).

Figure 4:
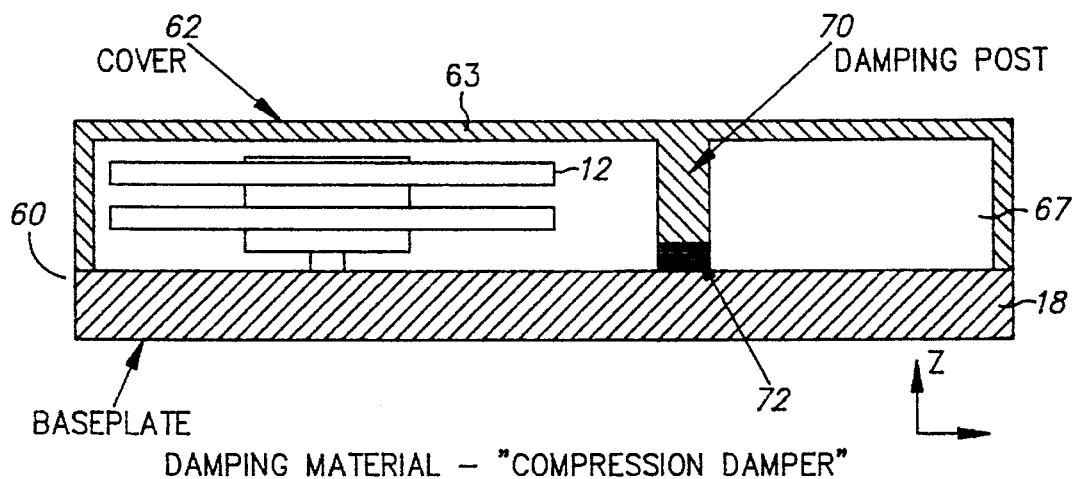
FIG. 4 is a schematic diagram of a cross section of a disk drive assembly.

Referring to FIG. 4, a disk drive 60 according to the present invention, has a damping post 70 which extends between the cover plate 62 and base plate 18 in the interior chambers 92 of the disk drive 60. A compressible damping material 72 is attached at an end of the post 70 abutting the interior surface of base plate 18 such that when the cover 62 and base plate 18 are in contact, and the housing 48 is in an assembled position, the damping material is slightly compressed. As shown in FIG. 4, the post 70 is integrally formed at an end with the cover 62. The damping post 70 is cast into the cover (or base plate) with minimal cost impact. Alternately, the post may be spot welded or bonded to sheet metal device enclosure parts.

The compressible damping material may be any material that is effective in absorbing energy when it is strained. Typically visco-elastic materials exhibit good energy dissipation characteristics. A gasket material that is used to seal the files is an adequate selection. The damping post material must also be qualified for chemical compatibility with the file. The damping material is preferably attached to the post with adhesive on one side. It is preferable not to have the damping post attached to both the base and cover so that the cover can be easily removed from the base in order to replace a defective internal component during a re-work process.

Referring to FIG. 2, the dotted line on the base plate indicated by 74 shows the location of the damping post when the enclosure is in a closed or assembled condition. The dotted line indicated by 76 on the exterior surface of the cover plate 63 shows the location of the damping post (not shown in this view) in the interior of the cover, extending downward from the cover plate to abut the base plate at the location indicated at 74.

The number of suitable locations for securing the damping post is limited in the interior chamber 92 of a disk drive 60 although there is substantial available space for the post to be located to be effective. The damping post must reside beyond the outer diameter of the disks 12, it also must be located outside the region of motion of the actuator.

The effectiveness of the damping post depends on the shape of a vibration mode that is causing an acoustic problem. The damping post is most effective if located at or near the point of maximum deflection of the mode. If the post is located at a point where there is no motion, a nodal point of the mode, then it will be ineffective. It is not always possible to locate the post at the exact point of maximum deflection but it should be located as near to this point as physically achievable.

The dynamics of the device enclosure are modified by a damping post incorporating a compression damper. The principal behind the use of the damping post is that when a device enclosure mode is excited, relative z-axis motion occurs between the cover and base. The damping material is alternately compressed and expanded by the vibration. The motion of the damping material dissipates energy and increases the effective damping of the vibration mode. Moreover, the damping post provides some additional stiffness and support to the device enclosure structure. The extra support is a function of the stiffness of the damping material. As the damping material becomes infinitely soft there is no added stiffness.

The preferred embodiment of this invention is to attach the damping post on the opposing surface of the interior chamber from the surface where the disk stack assembly and actuator assembly will be attached during the manufacturing process. The damping post should not be in the way during the initial phase of the manufacturing process when the disk stack assembly and actuator assembly are being secured to the enclosure. This is particularly important where the disk drive file is a small size and there is not much room to maneuver when attaching these components. During the manufacturing process, the disk stack assembly and actuator arms need to be merged. The actuator is placed onto the base plate with the arms extended away from the disks and then merged with the disk stack assembly. There needs to be room on the base plate for this maneuver. However, the damping post could still be integrally formed with or attached to either the upper or lower surface of the enclosure to still be effective for purposes of reducing acoustic noise.

Figure 5:
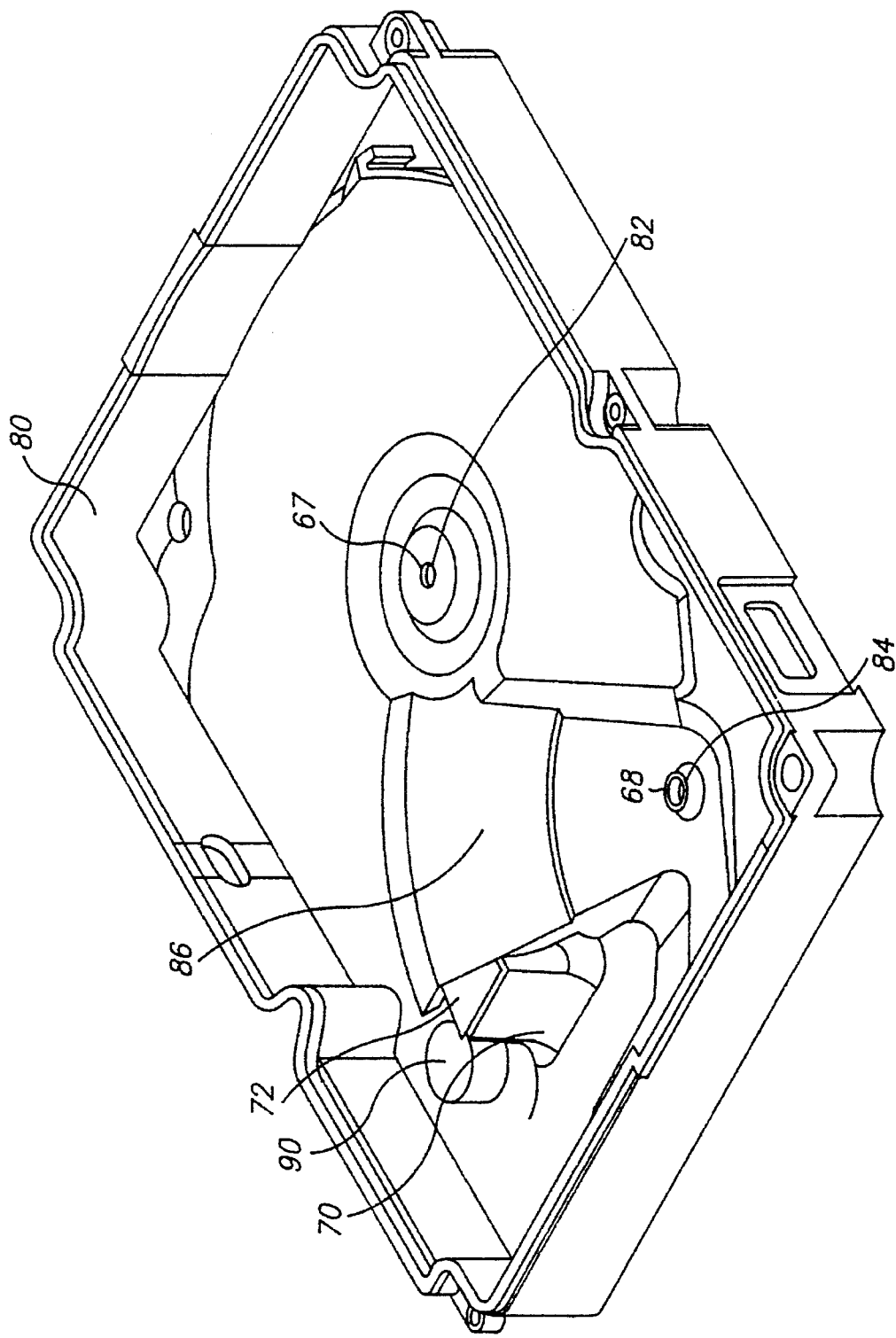
FIG. 5 is a perspective view of the interior of a disk drive cover according to the present invention.

Referring to FIG. 5, features 82, 84 and 86 accommodate the spindle, actuator and actuator motions respectively. Depression 86 allows for the motion of the actuator across the disk. The cover interior 80 also has a air filter 90. The damping post 70 is integrally formed with the interior of the cover adjacent the locations where the disks and air filter will reside, and to accommodate the range of motion of the actuator arm.

As shown in the drawings, the damping post is generally triangular in shape and tapers from the base where the post is integral with the cover. This design was the most effective for the configuration of the drive in order to fit in with the drive components. Other configurations such as rounded or squared post would achieve the same effects as described. The tapering is helpful for removing the cover from the casting.

Figure 6:
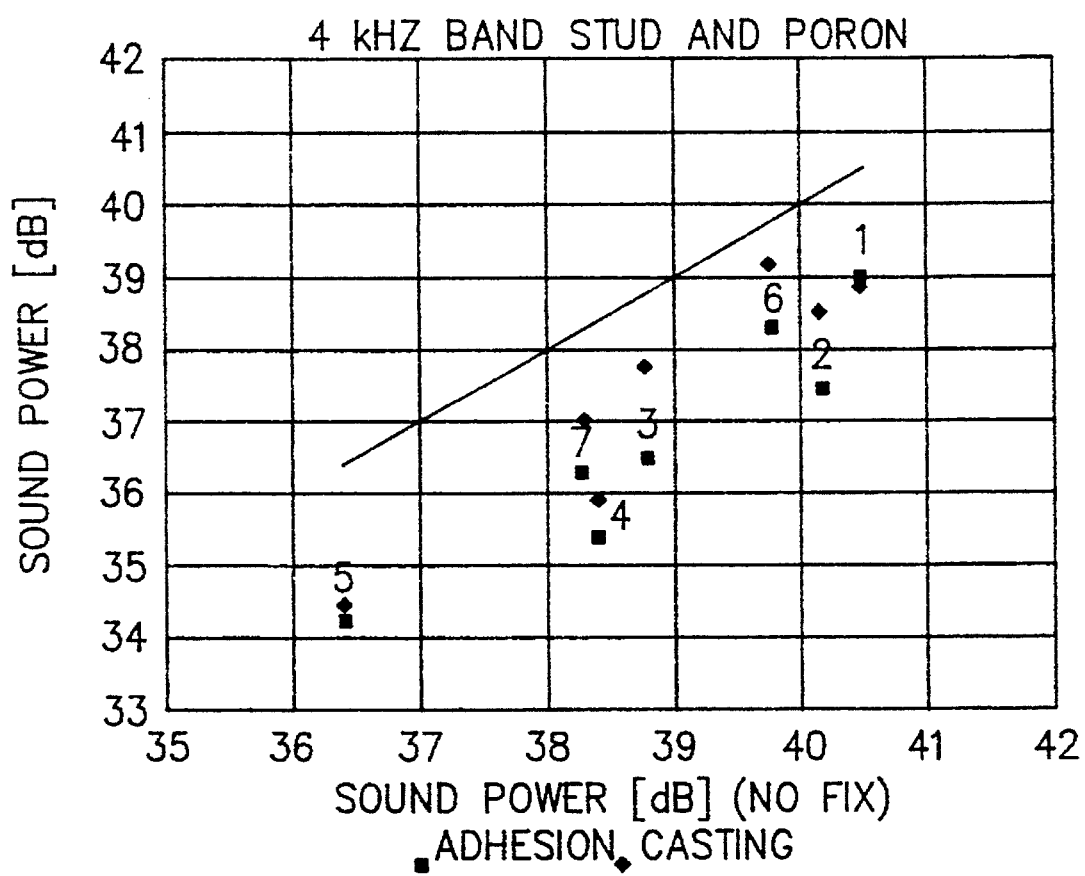
FIG. 6 is a graph of measured sound power levels with and without the present invention enclosure.

The damping post has been proven to be effective in reducing acoustic noise in disk drives. The incorporation of the damping post in a particular disk drive increased the acoustic yield by 20% in manufacturing. This was achieved by reducing the sound power in the 4 kHz octave band by 2.6 db. The increased yield resulted in a substantial savings in manufacturing costs. FIG. 6 shows the measured acoustic improvement in the 4 kHz band on several disk drives. The abscissa is the measured acoustic sound power without the damping post. The ordinate is the sound power measured with the damping post added to the drive. The solid line represents what would be plotted if there were no acoustic improvement with the damping post. The fact that the data lies below the solid line indicates an acoustic improvement with the damping post.

The damping post modifies the dynamics of the device enclosure at a minimal cost and almost no impact to the manufacturing process. The damping post can be attached to the cover or base plate of the disk drive to reduce the acoustic noise emanating from the drive. The damping post modifies the dynamics of the cover or base to effectively reduce the ability of the device enclosure to act as a speaker which in turn reduces the acoustic noise.

In addition to the damping effect that can be achieved by using the post, the frequencies of problem device enclosure modes are also shifted away from excitation frequencies through a mass-loading effect. The mass of the post can be adjusted to shift the device enclosure frequencies away from source excitation forces which usually arise from the spindle (or actuator). Thus the size and geometry of the post can be adjusted to achieve the added mass loading effect.

The damping post reduces acoustic noise emitted by a disk drive by modifying the dynamic characteristics of the device enclosure and damping vibrations that can lead to acoustics. The disk drive device as described herein performs this function while also achieving the goal minimizing additional manufacturing cost. The post may be cast into the baseplate or cover of the device enclosure with minimal cost. The damping material applied to the end of the post has minimal volume and is easily applied to the post with minimal cost or labor impact to the assembly procedure of the disk drive file. The mass of the damping post can be adjusted to affect the dynamics of the device enclosure as desired for any particular acoustic case.

There are many modifications and variations of the above described embodiment of the present invention that are possible in light of the above teachings. It is therefore understood that within the scope of the appended claims and their equivalents the invention may be practiced otherwise then specifically described.

We claim:

1. A disk drive assembly comprising:
a disk stack assembly comprising at least one disk;
an actuator assembly;
a housing having an inner chamber;
a post, separate from said disk stack assembly and said actuator assembly, extending from a first surface of said inner chamber, said post having a compressible material at an end, said compressible material abutting in a compressed state an opposing second surface of said inner chamber.

2. The disk drive assembly of claim 1 wherein said first surface and said opposing second surface are the largest surfaces of said inner chamber.

3. The disk drive assembly of claim 1 wherein said post extends perpendicularly between said first surface and said opposing second surface.

4. The disk drive assembly of claim 1 wherein said post is integrally formed with said first surface of said inner chamber.

5. The disk drive assembly of claim 1 wherein said compressible material of said post is unattached from said opposing surface.

6. The disk drive assembly of claim 1, wherein said disk drive assembly is manufactured such that said disk stack assembly and said actuator assembly are first mounted on said opposing surface.

7. The disk drive assembly of claim 1, wherein said post is positioned adjacent said disk stack assembly towards an end of said inner chamber where said actuator assembly is positioned.

8. The disk drive assembly of claim 1, wherein said compressible material is a visco-elastic material.

9. The disk drive assembly of claim 1, wherein the damping material is a foam material.

10. The disk drive assembly of claim 1, wherein said damping post is disposed as close as possible to a point of maximum deflection of the vibration mode of the device enclosure.

11. The disk drive assembly of claim 1, wherein the mass of said damping post is such that the device enclosure frequencies are shifted away from source excitation forces that adversely impact the disk drive acoustic performance.

12. A housing for a disk drive assembly comprising at least one disk, having an outer diameter, rotatably mounted on a shaft with at least one head for reading and writing data to and from the disk attached to an actuator having a range of motion, said housing comprising:
a base;
a cover;
peripheral sidewalls extending between said base and said cover; and
a damping post extending perpendicularly between said base and said cover within said housing separate from the shaft and the actuator, positioned beyond the outer diameter of the disk and outside the range of motion of the actuator, said post having a substantially rigid portion and a substantially flexible portion.

13. The housing of claim 12, wherein said rigid portion of said damping post is integral with said cover and said flexible portion is in a compressed state abutting the interior surface of said base when the housing is in assembled condition.

14. The housing of claim 12, wherein the flexible portion is unattached from said base.

15. The housing of claim 12, wherein said damping post is positioned as close as possible to a point of maximum deflection of the vibration mode of the device enclosure.

16. The assembly of claim 12, wherein said shaft and said actuator are secured to the interior surface of said base, and said post is secured to said cover prior to said cover being secured to said base.

17. The disk drive assembly of claim 12, wherein said compressible material is a visco-elastic material.

* * * * *